Figure 6:
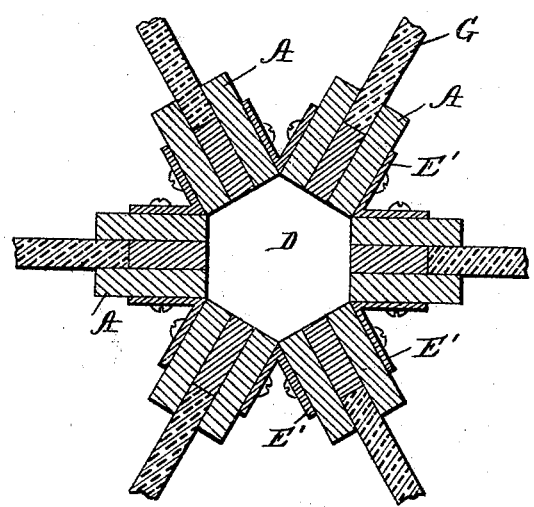

(No Model.)
2 Sheets—Sheet 1.
H. E. PERRY.
OPTICAL ILLUSION.
No. 500,607.
Patented July 4, 1893.
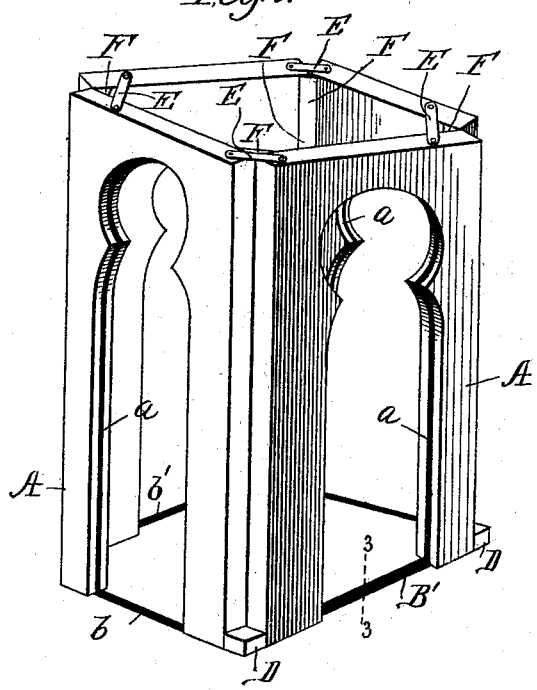
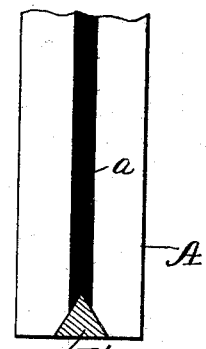
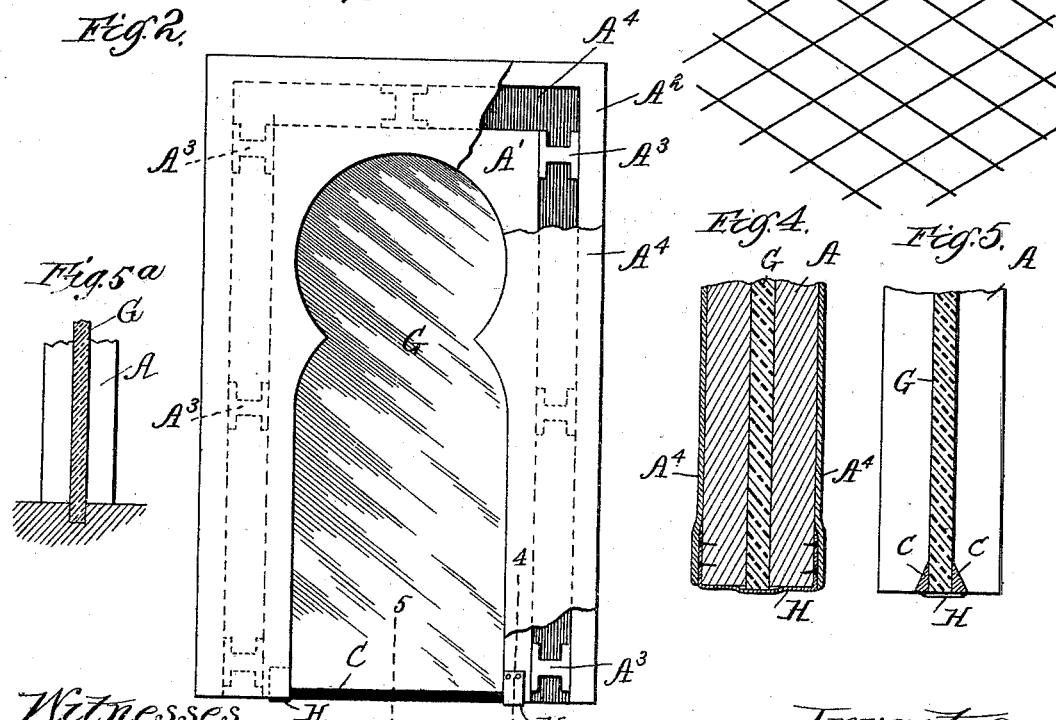
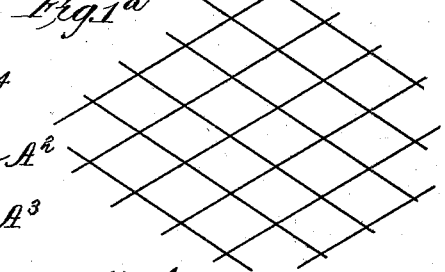
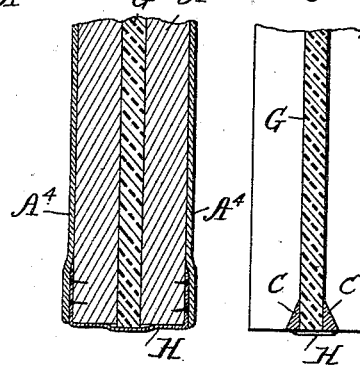
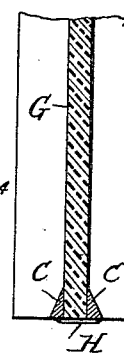
Witnesses.
Inventor.
Howard E. Perry
By Elliott Hopkins
Attys.

(No Model.) 2 Sheets—Sheet 2.

H. E. PERRY.
OPTICAL ILLUSION.

No. 500,607. Patented July 4, 1893.

Witnesses.
Wm. M. Rheem.
Wm. F. Hanning

Inventor
Howard E. Perry
By Elliott & Hopkins
Attys

UNITED STATES PATENT OFFICE.

HOWARD E. PERRY, OF CHICAGO, ILLINOIS.

OPTICAL ILLUSION.

SPECIFICATION forming part of Letters Patent No. 500,607, dated July 4, 1893.

Application filed April 8, 1893. Serial No. 469,533. (No model.)

*To all whom it may concern:*

Be it known that I, HOWARD E. PERRY, a citizen of the United States, residing at Chicago, in the county of Cook and State of Illinois, have invented certain new and useful Improvements in Optical Illusions, of which the following is a full, clear, and exact specification.

My invention relates to devices for producing optical illusions as objects or places of amusement or entertainment, and it has more especial reference to that class of such devices in which mirrors mounted in frames and arranged angularly with reference to one another, so as to form labyrinthian passages, are employed for rendering the illusion more complete and bewildering. In devices of this kind it is of course necessary, in order to make the deception of the observer complete, that some of the frames or arches which compose the various passage-ways or compartments, be left open or empty while others are provided with clear glasses and the remainder with mirrors; but wherever a glass is situated, whether it be a clear glass or a mirror, a line is produced on the floor by the lower edge of the glass and also up the edges of the frame or arch by, in the one case, the reflection of the edge of the rabbet in which the mirror is situated, and in the other case, by the groove itself in which the edges of the glass are inserted. These lines however, do not appear in the open or empty arches and of course it is thus made an easy matter for an observer to distinguish the empty arches from those closed by the glass, and this defeats the whole object of the device however perfect it might otherwise be. It is also found in practice that where the deception is complete, disguising the presence of the mirrors and plain glasses, it becomes necessary to provide against breakage of such glasses by unsuspecting persons walking against them. It is also very desirable that a device of this character be of knock-down construction so that it may be readily taken up and packed in a compact form for shipment from place to place, and thus rendered available for traveling showmen. Therefore, one of the objects of my invention is to so disguise the open or empty arches or frames that the same may not be distinguishable from those containing glasses or mirrors.

Another object of my invention is to so mount the glasses or mirrors in their frames that they will yield to a shock or pressure, and thus avoid breakage. And a still further object is to construct the device in the form which is commonly termed "knock-down-shock" whereby it will be adapted to the exigencies of transportation, and its parts may be readily set up and adjusted to the proper position, and the mazes of the labyrinth easily changed from time to time.

With these ends in view my invention consists in certain features of novelty by which the said objects and certain other objects of minor importance hereinafter described, as fully explained with reference to the accompanying drawings and more particularly pointed out in the claims.

Figure 7:
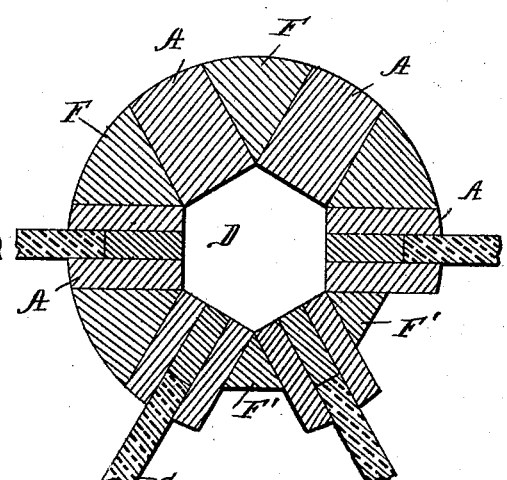
Figure 8:
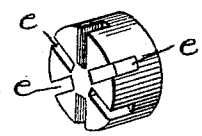
Figure 9:
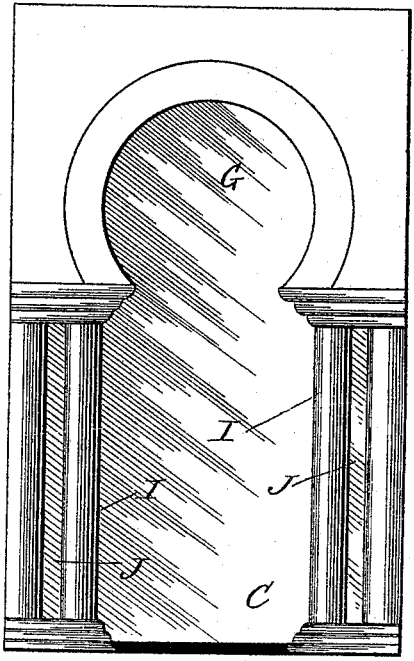

In the said drawings, Figure 1 is a perspective view of a number of the frames or arches set up in position, illustrating the manner of securing them together. Fig. 1ª is a diagrammatic view of a ground plan hereinafter explained. Fig. 2 is an enlarged detail view of one of the frames or arches illustrating the preferred manner of constructing the same. Fig. 3 is an enlarged detail sectional view taken on the line 3—3, Fig. 1. Fig. 4 is an enlarged detail sectional view taken on the line 4—4, Fig. 2. Fig. 5 is a similar section taken on the line 5—5, Fig. 2, illustrating means for hiding the base or edge of the glass. Fig. 5ª is a modification of the same on a smaller scale. Fig. 6 is an enlarged plan sectional view illustrating a modification of the means for securing the frames or arches together. Fig. 7 is a similar view of a further modification thereof. Fig. 8 is a perspective view of a cap-piece hereinafter described, drawn to a smaller scale. Fig. 9 is a side elevation of one of the frames or arches, illustrating a further form of my invention used under certain circumstances hereinafter described.

In the drawings wherein like signs of reference indicate like parts throughout the several views, A represents the frames or arches which may be of any suitable pattern or design, and which, in the construction of the labyrinth, or other form of inclosure, may be set up on end, edge to edge at any angle to each other as shown in Fig. 1. Any desired number of these frames may be set up at an angle to each other along the lines of any desired ground plan, such for instance as indicated in Fig. 1ª, the frames being so arranged as to produce a tortuous passage or labyrinth of the desired form as will be understood. These frames are preferably held in place by the means which I will hereinafter describe, but in the broad sense of my invention in so far as it relates to the construction of the frames *per se*, and to the means of disguising the glasses or mirrors, the means of securing the frames together is immaterial. It will be understood that in each of these frames which contains a clear glass or mirror, there will appear on both sides of its inner edge a dark line, which in those frames containing the mirrors, will appear to be mid-way between the faces of the arch by reason of the reflection, while in the arches containing the clear glasses such line will appear at the same relative point, because the groove in which the edge of the glass is set, is actually formed at that point; and the base or lower edge of each glass, whether it be a mirror or clear glass, will also produce a line on the floor across the arch from one side to the other, and the color and breadth of which will depend upon the color of the floor and the thickness of the glass. Inasmuch as it is impossible to obliterate these lines and as they do not occur naturally in the open or empty arches, I provide the edges of such empty arches with a line or groove $a$ whose width and color are in imitation of the line produced by the edge of the glass where it enters the frame, thus making it impossible to tell from a casual inspection whether such line is artificial or is due to the presence of the mirror or glass in the frame. If desired, the line produced by the base of the glass resting on the floor may be imitated in the empty arches by simply painting or marking the floor as shown at $b$, but I have found in the use of my invention, that this method is not altogether satisfactory inasmuch as such lines $b$ are soon obliterated by the feet of the spectators, and in the course of a short while a well defined path appears which may be followed and the maze of the labyrinth thus readily threaded. In order therefore, that the imitation in the empty arches of the line produced by the lower edge of the glass may be indestructible, I employ a strip or sill B′ which is secured on the floor from one side of the arch to the other as indicated on the right in Fig. 1. This sill however, does not resemble the line produced by the glass itself, and therefore, in order that the lines which appear across the bases of all the arches may appear the same, I imitate the sill or strip B′ on the base of each glass or mirror. This may be accomplished by painting a black strip of any other color in imitation of the sill B′, directly on the lower edge or even on the bottom of the glass, but a more preferable method is to secure at the lower edge or base of the glass an angular strip C of wood or other suitable material which is an exact counterpart of one half of the sill or strip B′ divided vertically. This strip C not only imitates the sill B′ and hides the line necessarily produced by the lower edge of the glass, but it also shields the glass against breakage from the impact of shoe soles or other objects that are liable to be forced against it.

In order that the sills or strips B′ may appear at all times like the portions or strips C and the spectator prevented from seeing both sides of the sill or strip B′ until he arrives at a point almost directly over it, I form such strip or sill B′ triangular in cross-section as shown in Fig. 3; thus presenting to the observer but one side of the strip at a time, this triangular form being preferable to a form semi-circular in cross-section because of the sheen or line of light that would always appear on the latter. The sills B′ may be constructed of any suitable material and colored to suit the fancy, but it is of course essential to good results that they be formed of metal or some other indestructible substance in order that the wear of the feet thereon will be imperceptible.

The clear glasses will of course be provided with the strips C on both sides as indicated in Fig. 5.

With a device thus constructed the observer sees innumerable arches each crossed by one of the sills B′, some of which are mere reflections, others empty arches, while still others are real arches containing mirrors or clear glasses, but as each is an exact counterpart of the other, it is difficult to determine which are the open arches. Another simple method of accomplishing the same end is to let the base of the mirror or glass into a groove in the floor as indicated in Fig. 5ª. Thus the base of the glass is supported and a dark line produced. When this is done however, the flooring across the empty arches would be provided with a groove as indicated at $b'$, Fig. 1, which would be a counterpart of the groove shown in Fig. 5ª.

In order that the device may be readily taken apart and packed for shipment and as readily set up and adjusted, I make each frame or arch separate and complete in itself, and employ separate devices to be used in conjunction therewith for securing these frames together in the form of a labyrinth. The preferred means for doing this consists of an angular block D which is secured to the floor in any suitable manner at the point where the edges of the adjacent frames come together as shown in Fig. 1, the angles or sides of such block being dependent upon the number of frames which abut against it, and the angle which they assume with reference to each other. Thus it will be seen that when the block is surrounded on all sides by the frames the bases of the latter will be held in place. The upper ends of the frames may be held against displacement by thin strips E tacked or otherwise secured across the corners from one to the other, and after this has been done the joints or cracks formed by the meeting edges of the frames may be concealed, and the appearance of a column produced by means of angular strips F as shown in Fig. 7, secured therein; or if desired, these strips may be used without the strips E inasmuch as the strips F in themselves will serve to secure the frames against displacement. The strips F may be of such form as to come out to the edges of the frames as shown on the upper side in Fig. 7, or they may be set in as shown at F' on the lower side in Fig. 7, so as to allow the edges of the arches or frames to project beyond them.

Instead of the strips E, the frames may be secured together by means of angle-irons E' as shown in Fig. 6, which will also serve to determine the angularity of the frames; and instead of the plain strips E employed in Fig. 1 for holding the upper ends of the frames together, the same object may be accomplished by means of the cap shown in Fig. 8, provided with a series of sockets or grooves $e$ arranged at the proper angle with reference to one another for the reception of the upper corners of the frames. In order that the glass G, whether it be a mirror or a clear glass, may be capable of yielding as a whole to the impact of a person walking against it or to the shock resulting from any other cause, I compose each of the frames containing the glasses of an inner frame A', and an outer frame $A^2$ which may be secured together in any suitable manner that will permit of slight deflection of the inner frame independently of the outer one. This may be accomplished by means of a suitable number of brackets $A^3$ secured to the inner edges of the outer frame and the outer edges of the inner frame as shown in Fig. 2, the whole being covered by an envelope $A^4$ of canvas or any other thin flexible sheeting. By this means the glass is provided with a firm and rigid support in the form of the frame A, which will relieve the glass of the strain and at the same time will be capable of yielding as a whole to any pressure that would be liable to fracture the glass if rigid. This construction has the further advantage of rendering the frame light.

Inasmuch as it is desirable to rest the edge of the glass upon the floor it is necessary to employ thin strips such as the strips H, for preventing the glass slipping out of the frame during transportation and erection. These strips are looped under the edge of the glass on both sides as shown in Fig. 2, and tacked or secured to the frame in any suitable manner as shown in Fig. 4, they being covered by the outer envelope of canvas $A^4$, and they are preferably composed of stout parchment, as this material, so far as I have been able to discover, is the only substance which will support the glass without injuring it or the silvering thereon, it being found that metal, when brought in contact with the glass, causes it to crack, while leather and similar substances affect the silvering.

In Fig. 9 I have shown a further form or design of frame or arch which may be desirable under certain circumstances, and which consists of an ordinary frame or a frame such as shown in Fig. 2, provided on each side with the representations of pillars or columns I, either painted or actually formed thereon, and having between them a narrow mirror J, which gives the effect of a vacant space and leads an observer to believe that the columns stand apart and that there is actual space beyond them, whereas, in reality, the frame or arch may be closed by a glass or mirror G.

In describing my invention I have stated that at the bases of the empty arches along the floor and up the sides of such arches I provide an imitation of the edges of the glasses. It will of course be understood that by this expression I mean an imitation of not only the actual edge of the glass but also the artificial strip or other device employed to give that edge an unusual appearance.

Having thus described my invention, what I claim as new therein, and desire to secure by Letters Patent, is—

1. In a device for producing optical illusions, the combination with a number of arches or frames containing glasses, of a number of open arches or frames arranged at an angle to the first and having along their inner edges and the floor an imitation of the edges of the glass, substantially as set forth.

2. In a device for producing optical illusions, a number of open arches or frames each having a strip or sill extending from side to side at the base thereof, in combination with similar frames or arches containing glasses, and each of such glasses at its base having an imitation of such strip or sill, substantially as set forth.

3. In a device for producing optical illusions, a number of open arches or frames each having a strip or sill extending from side to side at the base thereof and being triangular in cross-section in combination with similar frames or arches containing glasses, and each of such glasses at its base having an imitation of such strip or sill, substantially as set forth.

4. In a device for producing optical illusions, a number of open arches or frames each having a strip or sill extending from side to side at the base thereof and being triangular in cross-section, in combination with similar frames or arches containing glasses and each of such glasses having at its base a strip or sill which is in imitation in size and color of one half of the said first sill divided vertically, substantially as set forth.

5. In a device for producing optical illusions, the combination of a number of individual frames representing arches or door-ways, arranged at an angle to each other, and means for securing the edges of said frames together, substantially as set forth.

6. In a device for producing optical illusions, the combination of a number of individual frames representing arches or door-ways arranged at an angle to each other, means for securing the edges of said frames together and strips or beads for concealing the cracks or joints between said frames, substantially as set forth.

7. In a device for producing optical illusions, the combination of a number of individual independent frames representing arches or doorways, arranged at an angle to each other, base-blocks adapted to be secured to the floor and against which the edges of said frames abut, devices for securing the upper ends of said frames together, and strips or beads secured in the corners formed by said frames, substantially as set forth.

8. An arch for the purpose described, in combination with a glass mounted yieldingly therein, substantially as set forth.

9. The combination of an outer frame and an inner frame yieldingly secured to said outer frame and having a glass mounted therein, substantially as set forth.

10. The combination of two frames arranged one within the other and connected together, a flexible sheeting or envelope covering said frames, and a glass mounted in the inner one, substantially as set forth.

11. The combination with a frame for the purpose decribed and a glass mounted therein and extending to the lower edge thereof, of the thin strips H secured to the edges of the frame and passing under the glass, substantially as set forth.

12. The combination with a frame for the purpose described having a mirror mounted therein, and being provided on its sides with a representation of objects I, of the mirrors J mounted between said objects I, substantially as set forth.

HOWARD E. PERRY.

Witnesses:
F. A. HOPKINS,
EDNA B. JOHNSON.